United States Patent Office 2,790,296
Patented Apr. 30, 1957

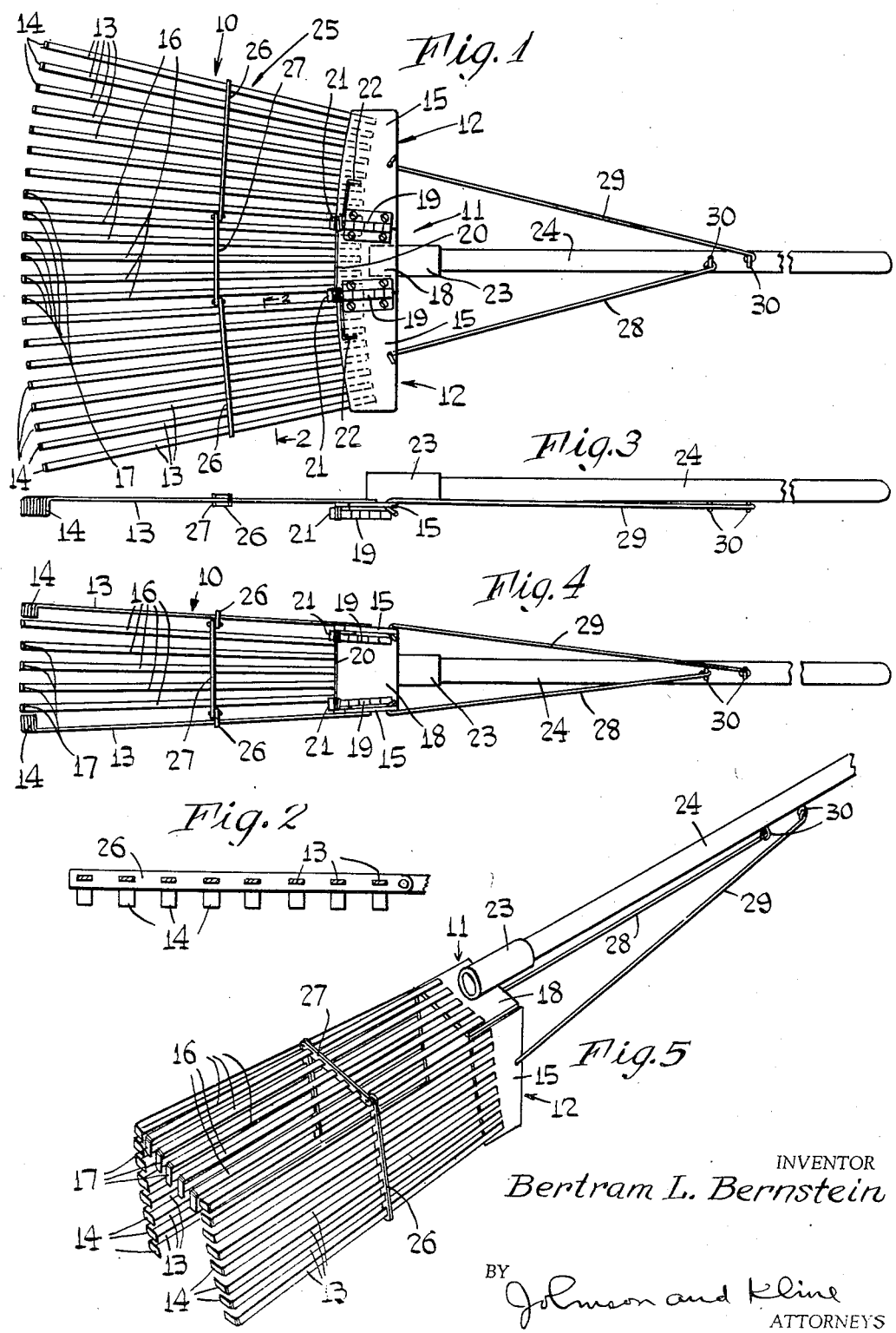

2,790,296

COMBINED RAKE AND PICKUP MEANS

Bertram L. Bernstein, Fairfield, Conn.

Application October 20, 1954, Serial No. 463,421

7 Claims. (Cl. 56—400.04)

This invention relates to garden implements, and more particularly to lawn rakes or broom rakes as they are sometimes called, which have long, flexible tines adapted to rake together leaves and cut grass on a lawn.

An object of the invention is to provide a novel and improved, combined lawn rake and pickup means by which the leaves and grass not only may be readily raked together but also conveniently and quickly picked up from the ground in a heap or mass. In accomplishing this object I provide a novel raking head having a plurality of elongate, substantially coextensive tines, and means securing the tines in operative relation with each other, said tines and securing means being divided into a center section and two juxtaposed, relatively-movable, outer sections disposed on opposite sides of the center section. I further provide hinge means connecting said sections together whereby the outer tine sections may be supported flat with the center section in an extended, fan-like configuration to constitute therewith a complete raking head, or may be folded toward each other in substantially parallel, spaced relation for grasping between them an accumulation of grass, leaves and the like for the purpose of picking up the same from the ground.

Another object of the invention is to provide an improved combined rake and pickup means as above set forth, wherein the tine sections are normally spring-urged to their flat, extended and operative positions, being foldable against the action of the spring means for the purpose of embracing the matter to be picked up.

A still further object of the invention is to provide an improved, combined rake and pickup means in accordance with the above, wherein the outer tine sections may be easily and quickly manipulated from a location on the handle of the rake, thereby eliminating the necessity for stooping or bending over any appreciable amount.

Yet another object of the invention is to provide an improved, combined rake and pickup means as above characterized, which is relatively strong and sturdy, compact in its construction, and simple and economical to manufacture.

A feature of the invention resides in the provision of an improved, assembled pickup means employing tines having curved ends, wherein the curved tine ends are directed towards each other when the tine sections are folded, thereby the facilitate gripping of the accumulated mass which is to be picked up.

Other features and advantages will hereinafter appear.

In the accompanying drawings:

Figure 1 is a plan view of the underside of an improved rake and pickup means made in accordance with the invention, the tine sections being extended so as to constitute a raking head.

Fig. 2 is a transverse section taken on line 2—2 of Fig. 1.

Fig. 3 is a side edge view of the rake and pickup means.

Fig. 4 is a bottom view of the rake with the outer tine sections folded toward each other for the purpose of grasping and picking up an accumulation of grass or leaves and the like.

Fig. 5 is a perspective view of the improved rake and pickup means, with the outer tine sections in folded positions.

Referring to Figs. 1–3 the improved, combined rake and pickup means comprises a raking head 10 constituted of a center tine section 11 and a pair of outer tine sections 12 movably mounted with respect to the center section 11. The outer tine sections 12 comprise a plurality of elongate, flexible, substantially coextensive tines 13 the foremost ends 14 of which are bent or hooked to provide raking fingers. The back ends of the tines 13 are secured to a pair of plates 15, which are adapted to support the tines in operable relation with each other. The center section 11 comprises a plurality of elongate, substantially coextensive tines 16 the front ends 17 of which are bent or hooked to provide raking fingers. The ends of the tines 17 are attached to a center plate 18 which is adapted to support the tines in operable relation with each other.

By the present invention the outer tine sections 12 are pivotally connected to the center tine section 11 in such a manner that the three sections may be disposed flat in a fan-like configuration to constitute a raking head, or the two outer sections 12 may be folded toward each other in substantially parallel, spaced relation for grasping between them an accumulation of grass or leaves and the like.

The outer tine sections 12 are preferably pivotally connected to the center tine section 11 by hinges 19 which are attached to the adjacent edges of the plates 15 and 18 to enable the tine sections 12 to be folded downward and toward each other, as shown in Figs. 4 and 5, whereby the hooked ends extend inward or toward the tines of the opposite section.

For the purpose of yieldably holding the tine sections 11 and 12 in their extended, flat positions I provide a wire spring 20 having coils 21 encircling the pintles of the hinges 19, the spring having free ends 22 engaging the plates 15. The hinges 19 are of the type adapted to open only 180 degrees, and accordingly the spring 20 will normally maintain the tine sections 11 and 12 in outspread or extended raking position wherein they constitute a complete and operative raking head.

The center tine section 11 has a ferrule 23 adapted to receive a handle 24 by which the raking head my be readily manipulated.

For the purpose of reinforcing the tines 13 and 16, an articulated brace 25 is provided, comprising outer brace sections 26 and a central brace section 27 to the extremities of which the outer brace sections 26 are pivotally connected. The articulated brace 25 thus connects the tines 13 and 16 together and braces the same, while at the same time enabling the tine sections 12 to be folded about the center tine section 11.

In order to enable the tine sections 12 to be readily folded or unfolded I provide a novel actuating means comprising tierods 28 and 29 which are pivotally connected to the handle 24 by suitable eyes 30. The tierods 28 and 29 are joined to the plates 15 of the outer tine sections, preferably approximately midway between the ends of the plates, and are so arranged that a user may by grasping the tierods at a point below the eyes 30, fold the outer tine sections 12 downward and toward each other by a squeezing action.

The operation of the improved rake and pickup means of this invention is as follows: The spring 20 will normally yieldably hold the outer tine sections 12 and the inner tine section 11 in flat, extended positions wherein they constitute a raking head. With the tine sections in these positions the device may be used in the usual manner as a lawn rake to gather leaves, cut grass, etc., into piles. When it is desired to pick up or remove the piles, the outer tine sections 12 are folded toward each other an extent, by grasping the tierods 28 and 29 and bringing them together with a squeezing movement. The rake is placed around the pile or accumulation which is to be picked up, with the outer tine sections 12 partially folded, and then the tine sections 12 are brought together the maximum possible amount, causing them to grip the pile or accumulation. Holding the outer tine sections 12 in their gripping positions, the rake is turned upside down so as to dispose the center tine section 11 on the underside of the folded assemblage. This will prevent any loose material from falling out inadvertently, and the device may now be used to pick up and transfer the grasped material wherever desired. Upon release of pressure from the tierods 28 and 29 the spring 20 will automatically extend the outer tine sections 12 into the positions whereby they cooperate with the center tine section to produce the raking head.

I have found that my improved rake and pickup means as above set forth is extremely simple and easy to operate, and effective and reliable in removing leaves, grass and other debris from a lawn. The device is sturdy in construction, small and compact, light in weight, and economical to fabricate, and eliminates the need for a person bending down or stooping any appreciable amount in order to transfer a raked pile or an accumulation of debris from the raked area.

Variations and modifications may be made within the scope of the claims and portions of the improvements may be used without others.

I claim:

1. A combined hand rake and pickup means comprising an elongate handle, a raking head carried by the handle, having a plurality of elongate, substantially co-extensive tines; means securing the tines in operable relation with each other, said tines and securing means being divided into a center section and two juxtaposed, relatively movable outer sections disposed on opposite sides of the center section; means mounting the center tine section to the handle; and hinge means connecting said sections together, said connecting means and securing means enabling the outer tine sections to be supported flat with the center section, all said tines thereby constituting an extended fan-like configuration and said mounting means supporting the tines substantially in the plane of the handle and beyond the same whereby the three sections constitute a raking head, said connecting means enabling the tine sections to be swung toward each other in substantially parallel, spaced relation for grasping between them an accumulation of grass, leaves and the like for the purpose of picking up the same from the ground.

2. The invention as defined in claim 1 in which there is a handle connected to the center section and manually-operable means connected to the handle and outer sections, for actuating the latter between extended and folded positions.

3. The invention as defined in claim 2 in which the manually-operable means comprises tierods connected with the outer tine sections and pivotally joined to the handle to swivel thereon at a point remote from the tine sections.

4. The invention as defined in claim 1 in which there are spring means operable to move the outer tine sections into positions wherein all three tine sections are flat with each other.

5. The invention as defined in claim 1 in which there is an articulated brace connecting together the tines at points remote from the securing means.

6. The invention as defined in claim 1 in which the tines have hooked ends and in which the tine ends of the outer tine sections extend toward each other when said sections are folded.

7. A combined hand rake and pickup means comprising an elongate handle; a raking head carried by the handle, having a plurality of elongate, substantially co-extensive tines; means securing the tines in operable relation with each other, said tines and securing means being divided into a center section and two juxtaposed, outer sections disposed on opposite sides of the center section; means mounting the center line section to the handle; and means connecting said sections together, said connecting means and securing means enabling the outer tine sections to be supported flat with the center section, all said tines thereby constituting an extended fan-like configuration and said mounting means supporting the tines substantially in the plane of the handle and beyond the same whereby the three sections constitute a raking head, said connecting means enabling the tine sections to be swung toward each other in substantially parallel, spaced relation for grasping between them an accumulation of grass, leaves and the like for the purpose of picking up the same from the ground.

References Cited in the file of this patent

UNITED STATES PATENTS

| | | |
|---|---|---|
| 678,519 | Robinson | July 16, 1901 |
| 999,930 | Weisel | Aug. 8, 1911 |
| 2,032,954 | Reichard | Mar. 3, 1936 |
| 2,652,279 | Morris | Sept. 15, 1953 |